April 17, 1934.                 G. P. SPRINGFIELD                 1,955,371
                AUTOMATIC VEHICULAR RADIO CONTROL FOR RAILWAY CROSSINGS
                              Original Filed Aug. 25, 1931
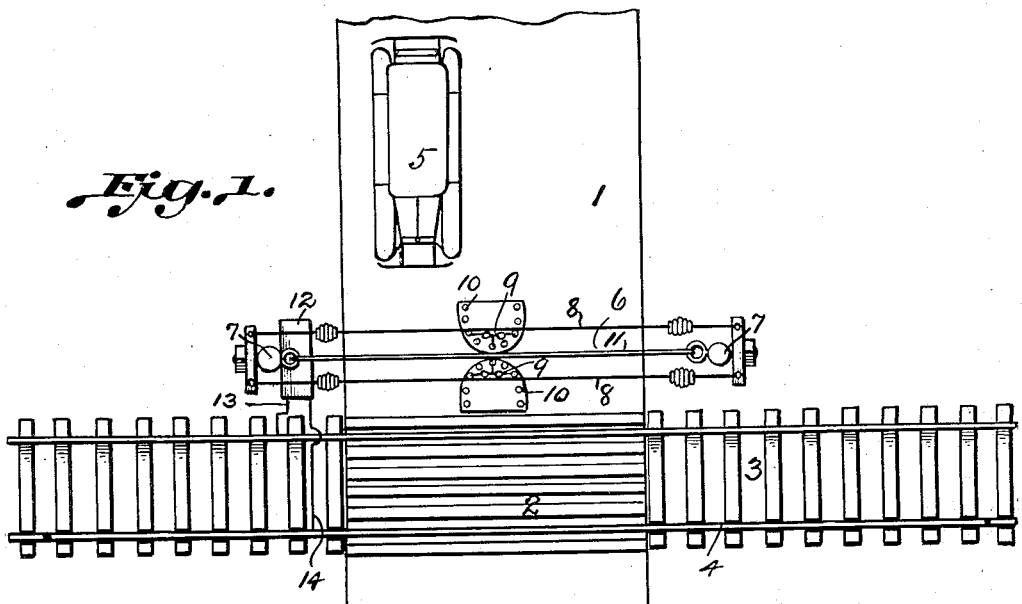
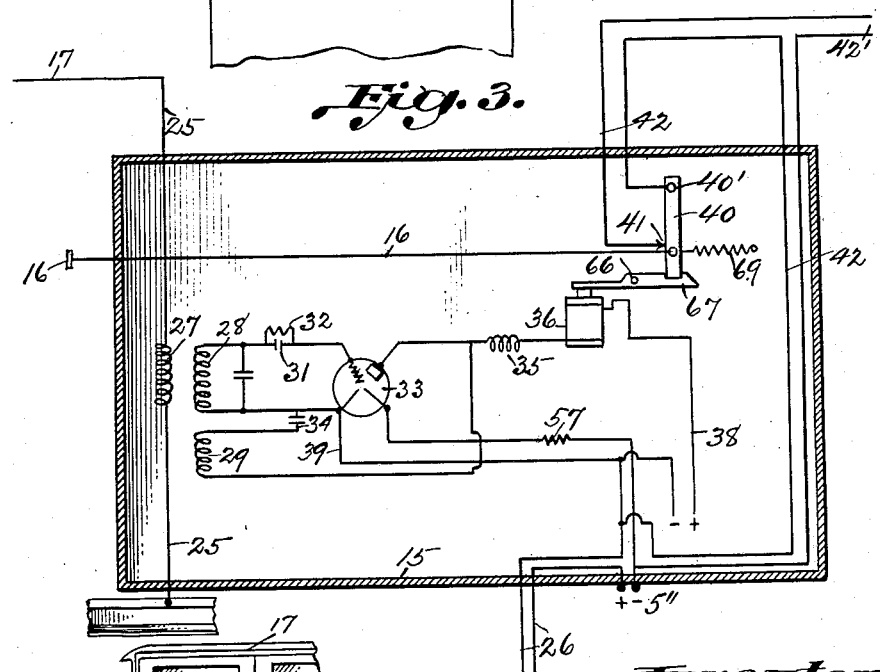
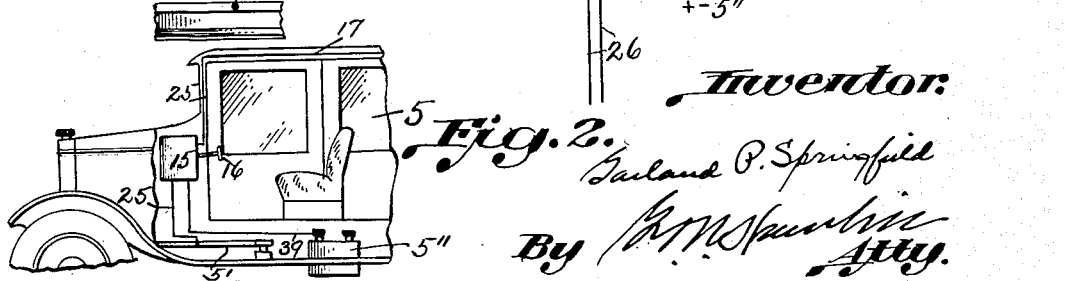
Inventor:
Garland P. Springfield Patented Apr. 17, 1934

1,955,371

UNITED STATES PATENT OFFICE 1,955,371

AUTOMATIC VEHICULAR RADIO CONTROL FOR RAILWAY CROSSINGS

Garland P. Springfield, Evansville, Ind.

Application August 25, 1931, Serial No. 559,279
Renewed January 26, 1934

2 Claims. (Cl. 246—30)

The object of this invention is to provide improved means for stopping automobiles and other power-propelled vehicles at railroad crossings on the approach of a train, through radio broadcasting control.

The present invention relates, more particularly, to improved means carried by an automobile or other power-propelled vehicle, as combined with suitable radio broadcasting control at the crossing, whereby a train approaching the crossing will short-circuit certain electrical connections and cause the radio broadcasting means at the crossing to send out radio impulses up and down the highway which will be collected and utilized by novel means on an automobile or vehicle approaching the crossing on said highway and cause the breaking of the ignition circuit of the automobile, thereby bringing the automobile to a stop at a safe distance from the crossing, and signalling the driver of the automobile of the approach of a train.

In the accompanying drawing:

Figure 1 is a plan view showing a part of a railroad track, a highway, and a crossing, equipped with radio broadcasting means under the control of an approaching train, an automobile subject to control thereby being illustrated;

Fig. 2 is a fragmentary elevation of an automobile equipped with radio-impulse receiving means by which its ignition circuit is controlled, according to the present invention; and Fig. 3 is a section through the control box of the automobile, diagrammatically illustrating the apparatus and circuits involved in the controlling mechanism carried by the car.

The highway appears at 1, the crossing is shown at 2, the railway track appears at 3, and an insulated rail thereof is shown at 4.

An automobile, equipped with my improved radio receiving device, is shown at 5.

In Fig. 1, I have shown so much of a radio broadcasting apparatus as will afford a full understanding of the manner in which the improved radio receiving apparatus carried by the car 5 is operated when a train, approaching the crossing 2, short circuits the insulated rail 4.

The length of the rail 4 will depend upon the distance from the crossing that it is desired to send out radio impulses to control the automobiles such as 5. Fifteen hundred feet from the crossing may be assumed suitable for the train to initiate radio broadcasting.

There is shown generally at 6, Fig. 1, a radio broadcasting apparatus which is preferably of improved construction.

Suitable stationary poles 7, properly anchored in the ground, afford a framework for carrying insulated wires 8 from which beam aerials 9 and shields 10 are suspended.

A guy-wire 11 connects the poles 7.

The shields 10 direct the radio broadcast up and down the highway 1, on both sides of the crossing 2 so that the full effect of the radio impulses, instead of being dissipated, is had on the apparatus carried by any automobile such as 5, approaching the crossing.

Contained within a suitable box 12 carried by one of the poles 7, is a radio broadcasting apparatus, preferably of improved construction. This apparatus broadcasts to the aerial 9, 10, radio impulses caused by short circuiting the continuous rail of the track 3 with the insulated rail 4 thereof, when a train runs onto said rails.

By the use of a suitable battery and circuits connecting the apparatus in box 12 with the aerial 9, 10 and by means of wires 13, 14 connected to the continuous rail and the insulated rail 4, respectively, the current becomes effective for broadcasting when a train contacts with rail 4.

The wires 8 are permanently grounded.

My present improvements having relation more particularly to the apparatus and circuits carried by the automobile 5, it will be understood that any suitable stationary radio broadcasting device may be used, although I prefer to provide in the region of the crossing the broadcasting arrangement previously described.

Carried by the automobile 5 at a suitable point, is a box 15 which contains the radio impulse receiving apparatus that controls the ignition circuit of the engine of the automobile. The resetting of the apparatus contained within the box 15, after the ignition circuit is automatically broken by an approaching train, is effected by any suitable manually operable means such as pull rod 16, as will presently appear.

At any suitable point on the automobile 5 as, for instance, in the roof thereof, there is provided an aerial 17. The wire netting provided in the top of certain automobiles may be used for this purpose.

The impulses received by the aerial 17 are conducted to the radio set within the box 15 by a wire 25 which includes a coil 27 which induces current into a coil 28. The circuit 25 is connected to the chassis or frame 5' of the automobile 5.

Impulses induced into coil 28 pass through gridleak and condenser 31 and 32, respectively, into the grid of vacuum tube 33 thence to tube filament to negative pole and back to coil 28. This sets up an electronic action which causes an emission of electrons from the filament to the plate along connection 39 to the negative terminal of a 45-volt battery, thence from positive terminal of the battery along connection 38 to solenoid 36, through radio frequency choke coil 35 to plate of tube 33. The oscillation or feed-back circuit, as shown in Fig. 3, causes each impulse to be returned from the plate circuit back through coil 29, through condenser 34, thence into the grid circuit, as described above, where these impulses are further amplified, causing a greater current to flow in the plate circuit, as above described. Repetitions of this action set up oscillations which cause an armature 67 pivoted at 66 to be repelled by solenoid 36, thereby releasing a latch 40 which is pivoted at 40' and is drawn by a spring 69. The release of the latch 40 breaks the ignition circuit 42 at the contact point 41. As the ignition circuit 42 leads to the distributor of the automobile 5 at 42' and to the ignition switch of the car at 26, the ignition circuit to the engine of the car 5 is broken and the engine soon stops.

To enable the latch 40 to be re-set, after the lever 67 has been released therefrom by solenoid 36, so that the car may proceed after it has been stopped by radio control, as before explained, the pull rod 16 is provided, said rod being connected to the latch 40. By operating this rod, the driver may again engage latch 40 with lever 67 and complete the ignition circuit at the contact point 41.

What I claim is:

1. In an automatic vehicular radio control for railway crossings, the combination with means for broadcasting radio impulses toward self-propelled vehicles approaching the crossing, of a self-propelled vehicle having a propelling power plant and provided with radio impulse receiving controlling means for said power plant whereby said power plant may be disabled by radio impulses sent out by the aforesaid radio broadcasting means, a railway track having an insulated rail, and circuit connections including the track and said rail and the means for broadcasting radio impulses, said circuit connections being normally open but adapted to be closed when a train runs on said rail whereby said radio impulse broadcasting means is automatically train-controlled.

2. In an automatic vehicular radio control for railway crossings, the combination with means for broadcasting radio impulses toward self-propelled vehicles approaching the crossing, of a self-propelled vehicle having a propelling power plant and provided with radio impulse receiving controlling means for said power plant whereby said power plant may be disabled by radio impulses sent out by the aforesaid radio broadcasting means, a railway track having an insulated rail, circuit connections including the track and said rail and the means for broadcasting radio impulses, said circuit connections being normally open but adapted to be closed when a train runs on said rail whereby said radio impulse broadcasting means is automatically train-controlled, and manually operable re-setting or restoring means on the self-propelled vehicle, whereby the propelling power plant may be restored for operation at the will of an occupant of the vehicle.

GARLAND P. SPRINGFIELD.